US008271938B2

(12) United States Patent
Dussud et al.

(10) Patent No.: US 8,271,938 B2
(45) Date of Patent: Sep. 18, 2012

(54) FLEXIBLE BASE CLASS LIBRARY

(75) Inventors: Patrick H. Dussud, Redmond, WA (US); Scott D. Mosier, North Bend, WA (US); Peter F. Sollich, Munich (DE); Frank V. Peschel-Gallee, Kirkland, WA (US); Raja Krishnaswamy, Redmond, WA (US); Simon J. Hall, Seattle, WA (US); Madhusudhan Talluri, Bellevue, WA (US); Rudi Martin, Snohomish, WA (US); Michael M. Magruder, Carnation, WA (US); Andrew J. Pardoe, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1050 days.

(21) Appl. No.: 12/203,860

(22) Filed: Sep. 3, 2008

(65) Prior Publication Data

US 2010/0058283 A1  Mar. 4, 2010

(51) Int. Cl.
*G06F 9/44* (2006.01)
(52) U.S. Cl. ........ 717/106; 717/108; 717/116; 717/165; 717/166
(58) Field of Classification Search .................. None
See application file for complete search history.

(56) References Cited

U.S. PATENT DOCUMENTS

| | | | |
|---|---|---|---|
| 5,379,373 A | 1/1995 | Hayashi et al. | |
| 6,163,880 A * | 12/2000 | Ramalingam et al. | 717/104 |
| 6,513,152 B1 | 1/2003 | Branson et al. | |
| 6,564,375 B1 * | 5/2003 | Jiang | 717/165 |
| 7,140,012 B2 | 11/2006 | Pugh et al. | |
| 7,340,718 B2 * | 3/2008 | Szladovics et al. | 717/106 |
| 7,380,234 B2 * | 5/2008 | Gil et al. | 717/108 |
| 7,934,207 B2 * | 4/2011 | Gustafsson et al. | 717/143 |
| 7,979,842 B2 * | 7/2011 | Bloesch et al. | 717/108 |
| 8,024,721 B2 * | 9/2011 | Matic | 717/163 |
| 2003/0051073 A1 * | 3/2003 | Mishra et al. | 709/332 |
| 2003/0056195 A1 * | 3/2003 | Hunt | 717/116 |
| 2004/0133445 A1 * | 7/2004 | Rajan et al. | 705/1 |
| 2005/0155021 A1 * | 7/2005 | DeWitt et al. | 717/130 |
| 2005/0198624 A1 * | 9/2005 | Chipman | 717/146 |
| 2005/0229186 A1 * | 10/2005 | Mitchell et al. | 719/315 |
| 2006/0195476 A1 | 8/2006 | Nori | |
| 2006/0200759 A1 | 9/2006 | Agrawala | |
| 2006/0200817 A1 | 9/2006 | Callender | |
| 2006/0206862 A1 * | 9/2006 | Becker et al. | 717/106 |
| 2006/0212847 A1 | 9/2006 | Tarditi, Jr. et al. | |

(Continued)

OTHER PUBLICATIONS

William Wilson, Description on going to and from the java Object wrapper classes, Feb. 23, 2006, Tech-Recipes, 5 pages, <http://www.tech-recipes.com/rx/1216/java-wrapper-classes/>.*

(Continued)

*Primary Examiner* — Thuy Dao
*Assistant Examiner* — Cuong V Luu
(74) *Attorney, Agent, or Firm* — Workman Nydegger

(57) ABSTRACT

Mechanisms that allow frameworks significant flexibility in varying the library of common base classes in a manner that better suits the domain of applications served by the framework. Instead of providing the base class library, the runtime provides a data contract for the data structure of each base class. The frameworks can then define each base class in a custom way so long as the data contract is honored. Thus, for example, the framework may provide custom framework-specific methods and/or properties as is appropriate for the framework. Another framework might define the base classes in a different way.

18 Claims, 3 Drawing Sheets

U.S. PATENT DOCUMENTS

| | | | |
|---|---|---|---|
| 2008/0059940 A1* | 3/2008 | Matic | 717/100 |
| 2008/0059949 A1* | 3/2008 | Matic | 717/108 |
| 2008/0134016 A1 | 6/2008 | Niemoller | |
| 2008/0147698 A1* | 6/2008 | Gustafsson et al. | 707/101 |
| 2008/0235661 A1* | 9/2008 | Arpana et al. | 717/116 |
| 2010/0070960 A1* | 3/2010 | Atsatt | 717/166 |
| 2010/0095270 A1* | 4/2010 | Seitz et al. | 717/108 |

OTHER PUBLICATIONS

JavaTech, Wrapper Classes for Primitive Types, Oct. 20, 2004, 3 pages, <http://www.particle.kth.se/~lindsey/JavaCourse/Book/Part1/Java/Chapter03/wrappers.html>.*

Douglas C. Schmidt, ASX: An Object-Oriented Framework for Developing Distributed Applications, 1994, USENIX C++ Conference, CS17 pages, <http://www.cs.wustl.edu/~Schmidt/PDF/C++-USENIX-94.pdf>.*

Richard D. Hornung, Managing application complexity in the SAMRAI object-oriented framework, 2002, pp. 347-368, John Wiley & Sons, Ltd.<http://onlinelibrary.wiley.com/doi/10.1002/cpe.652/pdf>.*

Rajiv Sampath, An object-oriented framework for the implementation of adjoint techniques in the design and control of complex continuum systems, 2000, International Journal for Numerical Methods in Engineering, pp. 239-266, <http://mpdc.mae.cornell.edu/Publications/PDFiles/Paper40.pdf>.*

Steve Larson, A Framework-Based Approach to Science Software Development, 2000, IEEE, pp. 475-490, <http://ieeexplore.ieee.org/stamp/stamp.jsp?tp=&arnumber=878459>.*

Richard Mitchell, Extending a method of devising software contracts, 1999, Technology of Object-Orirented Languages adn Systems, 18 pages, <http://ieeexplore.ieee.org/stamp/stamp.jsp?tp=&arnumber=809429>.*

Alexander Blum, A Java-Based Framework for Real-Time Control Systems, 2003 IEEE, pp. 447-453, <http://ieeexplore.ieee.org/stamp/stamp.jsp?tp=&arnumber=1248733>.*

Type-Safe Cast (10 pages) http://www.cis.upenn.edu/~sweirich/papers/cast/cast.pdf, 2004.

On the Importance of Points—To Analysis and Other Memory Disambiguation Methods For C Programs (12 pages) http://www.cs.cmu.edu/afs/cs/academic/class/15745-s06/web/handouts/ghiya-pldi01.pdf, 2001.

Shadows: A Type-safe Framework for Dynamically Extensible Objects (37 pages) http://research.sun.com/techrep/1994/smli_tr-94-31.pdf (Nov. 1994).

Microsoft .Net Framework: The Common Language Runtime and Framework Class Library (36 pages) http://download.microsoft.com/download/f/f/5/ff59c72e-aedf-4574-af51-c4a26f48a037/MicrosoftCLR.exe (Nov. 2005).

* cited by examiner

FLEXIBLE BASE CLASS LIBRARY

BACKGROUND

A software framework provides generic application functionality that can be built upon and customized by an application developer. Different frameworks may provide different generic application functionality, and are thus suitable for different domains of applications. Thus, application developers select an appropriate framework on which to build their application, and author that application with the framework in mind.

One system provided by a framework is called a "type system" which defines the various extended type set that the framework uses, and defines the relationships between the types in the extended type set. The framework uses a library of primitive classes (also called a "base class library") offered by the runtime in which the application will execute. Such classes may include fundamental base types such as, for example, a root object class, a string class, an integer class, a floating point class, and the like. Such base classes may be included in, for example, a base class library.

Frameworks often offer extended hierarchical type systems that derive from the set of base class objects defined by the runtime. If multiple frameworks are to use the runtime, each with their own extended type system, each type system as derives from the same common set of base class objects which can be used by any framework built on the runtime.

BRIEF SUMMARY

Embodiments described herein relate to mechanisms that allow frameworks significant flexibility in varying the set of common base class libraries in a manner that better suits the domain of applications served by the framework. This contrasts with the conventional monolithic model in which a framework supports the whole set of common base class library objects and their whole set of functionality even if they are not needed for its applications served by the framework.

Instead of providing the base class library, the runtime provides a data contract for the data structure of the base class. The frameworks can then define the base classes in a custom way so long as the corresponding data contract is honored. Thus, for example, the framework may provide custom framework-specific methods and/or properties as is appropriate for the framework. Another framework might define the base class in a different way. Thus, frameworks may interoperate with the runtime and build type systems that include primitive base types that are more customized to the needs of that specific framework.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, the principles described herein provide mechanisms that allow frameworks significant flexibility in varying the library of common base classes in a manner that better suits the domain of applications served by the framework. Instead of providing the base class library, the runtime provides a data contract for the data structure of each base class. The frameworks can then define the base classes in a custom way so long as the corresponding data contract is honored. First, a general computing system will be described with respect to FIG. 1. Then, various embodiments will be described with respect to FIGS. 2 through 5.

Figure 1:
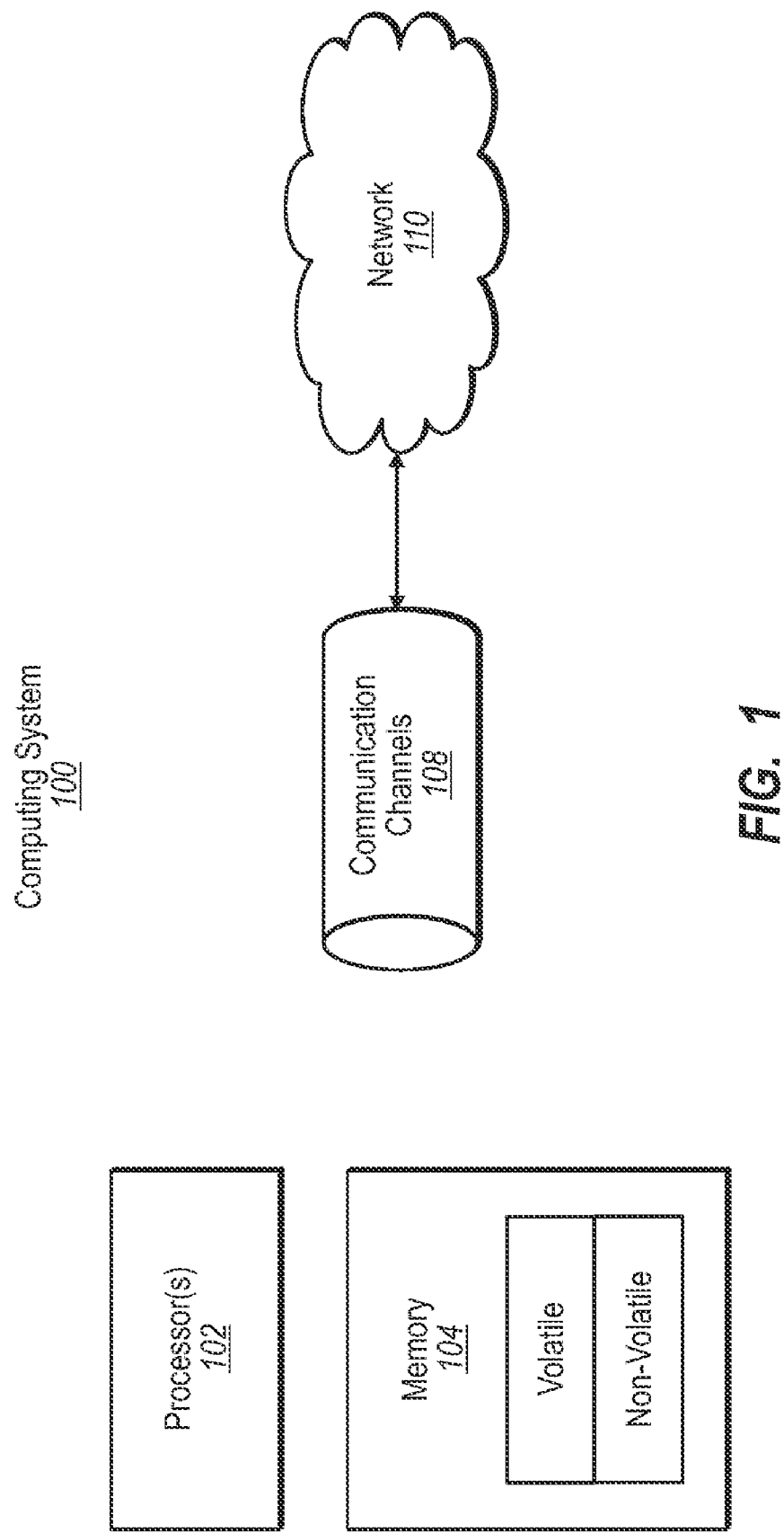
FIG. 1 illustrates a computing system that may implement one or more features described herein.

FIG. 1 illustrates a computing system 100. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110 (such as perhaps the Internet). Communication channels 108 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term "computer-readable media" as used herein includes both storage media and communications media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical storage and/or memory media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter as defined in the appended claims is not necessarily limited to the specific features or acts described herein. Rather, the specific features and acts described herein are disclosed as example forms of implementing the claims.

Figure 2:
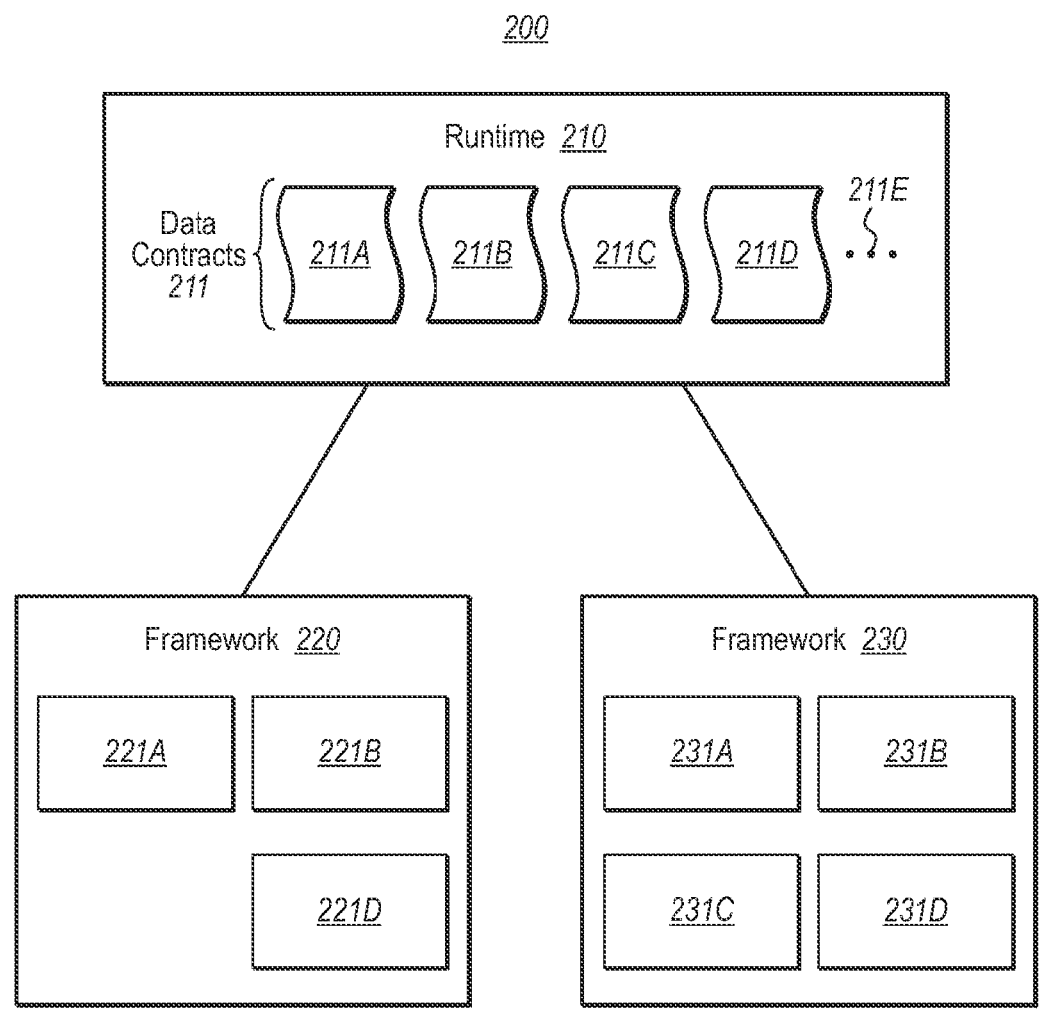
FIG. 2 illustrates a computer architecture in which a runtime offers a data contract for base classes, allowing the framework(s) to flexibly define the respective base class so long as the corresponding data contract is honored.

FIG. 2 illustrates a computing architecture 200. In one embodiment, although not required, some or all of the components of the architecture 200 may be software-based. For instance, in the case of a software architecture, some or all of the components of the architecture 200 may be instantiated in memory 104 of the computing system 100 of FIG. 1 upon the processor(s) 102 of the computing system 100 executing computer-executable instructions. Such computer-executable instructions may be stored on one or more computer-readable media such as those previously described.

The computing architecture includes a runtime 210. The runtime 210 provides a data contract for each of a number of base classes, without actually providing the base class themselves. For instance, the runtime 210 might specify how objects of a particular base class should be structured, but leaves flexibility on what methods a particular base class may support, what properties a base class may have, and what constructors are used to create an instance of the base class.

In FIG. 2, the runtime 210 is illustrated as providing four data contracts 211A through 211D corresponding to four base classes. However, the ellipses 211E represents that the runtime 210 may provide data contracts for other base classes as well, and may even provide data contracts for fewer base classes than four, and potentially as low as a single data contract for a single base class. Note that the runtime 210, being an object-oriented complex software component, may be built using base classes, and may itself have its own type system. However, the runtime 210 does not force outside frameworks to use that type system, nor even to have a particularly defined base class library. Instead, the runtime 210 permits outside frameworks to build their own base classes so long as they conform to the data contract provided by the runtime 210.

The architecture 210 may potentially also include a framework 220 that defines a first set of framework-specific base classes 221 corresponding to the data contracts provided by the runtime 210. For instance, base class 221A is defined by the framework 220 and conforms to the data contract 211A specified by the runtime 210. Base class 221B is defined by the framework 220 and conforms to the data contract 211B specified by the runtime 210. Note that there is no base class 221C illustrated. This emphasizes that at least in some embodiments, some base classes may be optional. Accordingly, even if the runtime 210 were to specify a data contract for a particular base class, there is no requirement that the framework define the corresponding base class. Continuing the example, base class 221D is defined by the framework 220, but corresponds to data contract 211D.

Since the frameworks are provided with considerable latitude in how the base class is defined, the framework-specific base classes may be quite unique to the framework, and may be tailored to suit the objectives and application domains served by framework.

For instance, consider a common base type called "string". A string is a class defined by a sequence of characters. The runtime 210 might provide a data contract that the string should include a sequence of two byte units, where each two byte unit may be interpreted as a character. The runtime 210 might also specify that the string is to have some administrative data associated therewith. For instance, perhaps the string object should begin with a type descriptor pointer of a certain length that points to a type descriptor having a particular schema. Other examples of as administrative data that might be included in the data contract include total number of characters in the string, and perhaps the total number of valid characters in the string since some two byte sequences might not necessarily correspond to a particular character at all.

Given this data contract, the framework has considerable flexibility in further defining the string base class. For instance, the framework might define the string base class as having no methods at all that can be called on objects of that string base class. On the other hand, the framework might define hundreds or thousands of methods that can be called on string base class objects. For instance, there might be a method for sorting the string in ascending ASCII code ordering, a method for descending ASCII code ordering, a method for capitalization of all letters in the string, a method for removing all numerals in the string, a method for substituting some words for others, and so forth. Different frameworks may have more use for some methods than others depending on the domain of applications the framework serves, and thus may selectively incorporate the more useful methods into their string base class. By not having to support the less useful methods, the type system can be made more efficient.

The framework may also define specific properties associated with the string. For instance, the string base class may have a count of the total number of capitalized letters, a count for the total number of numerals, a count for the total number of special characters, a language property specifying the asserted language of the string, and so forth. Once again, some frameworks may have more use for some properties than others, and thus the framework may define the base class as having the properties that are most useful to that framework, while another framework may as define the string base class as having different properties.

Each framework may also define a set of constructors that may be used to generate objects of the particular class, thereby leaving further flexibility to the framework. Frameworks have always been able to define custom type systems that build upon a common set of base classes. However, frameworks have used the common base class library that is offered by the runtime. Using the principles described herein, the frameworks have even been freed from having to use a common base class library. Instead, they may provide methods, properties, and constructors to the base class in a framework-specific way. In one embodiment, even the base class name may be changed, or perhaps also the assignment of the base class within a namespace may change from one framework to another.

Base classes are typically core building blocks that may be used to generate more complex classes and types. The example of a string has been discussed in some detail herein. However, other examples of base classes may be a character, an integer, and a root class (such as, for example, system object). While a data contract might be specified for each, the framework may have considerable flexibility otherwise to define base classes that suit the purposes of the framework.

Delving into the integer base class example further, the runtime may specify a certain byte length to represent the integer, and may indicate that the object should have a type descriptor point of a specified length at a specified portion of the object. The framework may then define the integer base class with perhaps no custom methods at all, or perhaps with one or more framework-specific methods that suit the purposes of that particular framework. As one example, perhaps one custom method might be a square root method that returns the square root of the integer as a floating point. Other custom methods may be more apparent to the framework author, who is as more likely to know what methods might be helpful in the context of that framework.

One of the advantages of this architecture is that multiple frameworks may use a single runtime on a single computing system, and still maintain not only their own type systems, but use different base classes altogether. For instance, a second framework 230 defines another set of base classes 231 that is tailored towards the purposes of the framework 230. In this case, the framework author has chosen to incorporate a corresponding base class 231A through 231D that corresponds to all of the base classes that the runtime 210 provides a data contract for. Accordingly, base classes 231A through 231D are each base classes that are specific to the framework 230, although they are defined in way that the definitions abide by the corresponding data contract. Thus, for example, even though base class 231A defined by the framework 230 conforms to the same data contract as the base class 221A defined by the framework 220, they may have widely different methods, properties and constructors.

Note that although the framework authors can, using the described principles here, have considerable flexibility in defining base classes, the framework author could still elect to define the base class such that one, some, or even all of the base classes defined by that framework are the same as one, some, or even all of the base classes defined by another framework. Nevertheless, the framework author may define the base classes such that none of the defined base classes for that framework are identical to any other base class defined by any other framework. However, in the case where the frameworks 220 and 230 define different base classes, the frameworks cannot share object instances since they cannot interpret the instances from other frameworks. In other words, because the type systems are disjoint, communications between frameworks are done with types that may be passed by value (i.e., as flat data) such as machine types and aggregates of machine types.

Accordingly, although not required, the runtime 210 may allow two diverse frameworks 220 and 230 to exist and use the services of the runtime 210, even though they follow two distinctly different type systems, and use two different base class sets. This allows for diversity in the types of frameworks that can be run on a single runtime, thereby allowing frameworks to be more efficiently oriented towards the domain of applications that the framework is intended to serve. This also allows for more efficient versioning of a framework, and allows a subsequent version to use a different base class. Thus, no longer would framework authors be limited to the base classes defined by previous versions of the framework. The framework author could simply modify the base class definitions for subsequent versions of the framework to better suit the operation of the framework.

Figure 3:
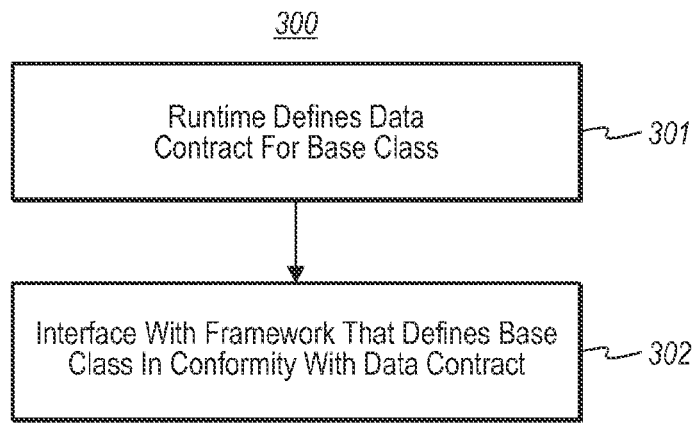
FIG. 3 illustrates a flowchart of a method for a runtime offering a type system foundation.

Accordingly, the runtime offers a type system foundation, while only specifying a data contract for some or potentially all of the set of base classes. FIG. 3 illustrates a flowchart of a method 300 for offering a type system foundation. The method 300 may be performed for each of multiple base classes.

The runtime defines a data contract for a base class without actually defining the base class (act 301). This does not exclude the possibility that there might be other base classes that the runtime does actually define. However, in one embodiment, the runtime does not define any base classes, but merely provides a data contract for each base class.

The runtime also interfaces with a framework that defines the base class in accordance with a framework-specific base class definition so long as the base class definition conforms to the data contract (act 302). This may be performed for multiple frameworks that define their own version of the base class. For instance, as frameworks 220 and 230 define their own version 221A and 231A of the base class corresponding to data contract 211A. Nevertheless, regardless of whether these versions 221A and 231A are different, they do both follow the data contract 211A. Accordingly, when communicating objects corresponding to the data contract 211A back and forth, it is only the flat data that is used in communication. If the frameworks communicate an object that follows the data contract 211A, the knowledge of that data contract permits the data to be interpreted, even though the custom framework-specific features of that object will not be used. The framework or runtime that sends an object with the assumption that the receiving entity will only use the object as flat data, unless the receiving object is an application that is using the framework.

Figure 4:
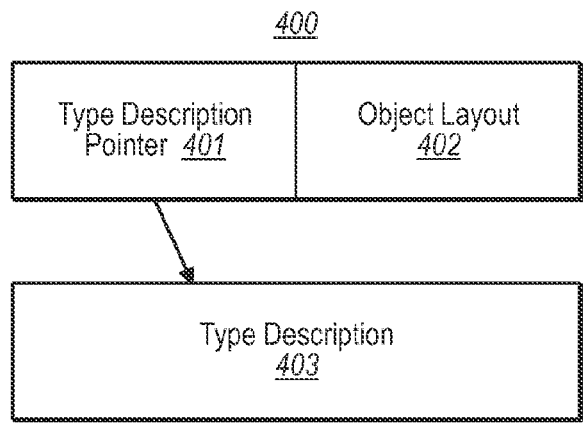
FIG. 4 illustrates an example data contract that specifies a type description pointer and an object layout, the type description pointer pointing to a type descriptor.

FIG. 4 illustrates an example data contract 400 that specifies a type description pointer 401 and an object layout 402. In this embodiment, all data contracts specify that the base class is to begin with a type description pointer 401. The object layout 402 may be specific to the base class. For instance, for a string, the object layout 402 may specify a sequence of two-byte characters. The type description pointer 401 points to a type descriptor 403. The type descriptor 403 may have a common schema such that it might be interpreted to understand the type. Accordingly, the type descriptor 403 may be used for a wide variety of purposes for which a precise understanding of the base class is needed.

As an example, the type descriptor 403 may be used to perform type safety between different type systems. For instance, to determine whether two objects are of the same type or are of equivalent types, the type descriptors for both objects may be reviewed and the appropriate information from each properly extracted and interpreted to formulate a reasonable conclusion on type equivalence. The type as descriptor may also be used to perform automatic memory management, to perform virtual calls, or to perform interface calls, or any other use for which a detailed knowledge of the type would be useful. In the case of automatic memory management, the data contract defined by the runtime may be such that it allows for garbage collection by the runtime.

Figure 5:
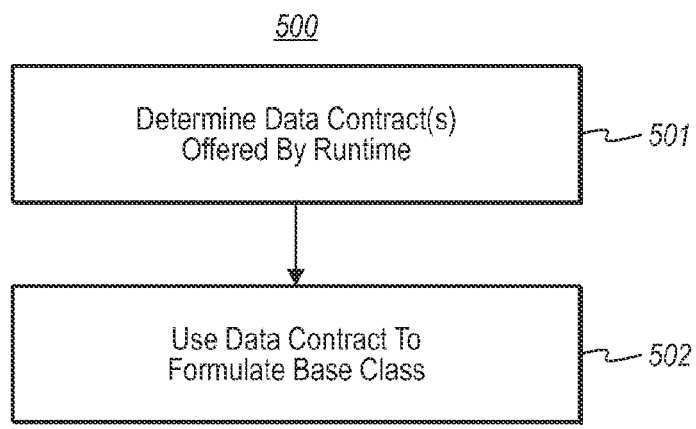
FIG. 5 illustrates a flowchart of a method for providing a framework type system.

FIG. 5 illustrates a flowchart of a method 500 for providing a framework type system. The method 500 may be performed when constructing a framework that is to interface with the runtime 210 of FIG. 2. First, the data contract offered by the runtime for each base class is determined (act 501). Then, for each of one, some, or potentially all of the base classes, the framework author defines the base type using the data contract to thereby formulate a framework-specific definition of the base type (act 502).

Accordingly, the principles described herein permit frameworks to have custom framework-specific base classes, while still allowing the applications to use a common runtime. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method for executing a runtime that creates a type system foundation where instead of providing a base class library, the runtime provides for different frameworks to each be able to define their own base classes in a custom way, the method comprising acts of:
  one or more processors instantiating a runtime that defines one or more data contracts for each of a number of base classes, without actually providing any of the base classes themselves, each data contract specifying how objects of a base class should be structured but otherwise permitting the base class to support different methods and to specify different properties that the base class may have, and what constructors are used to create an instance of a base class; and
  using the runtime to interface with at least two outside frameworks, each framework determining the data contracts offered by the runtime, and then each framework using one or more data contracts in building its own base classes so that each framework is not forced to use the runtime's base classes and type system but is instead free to build its own base classes so long as each base class built by a framework conforms to at least one data contract defined by the runtime.

2. A computer program product comprising one or more physical computer-readable storage media having thereon computer-executable instructions that, when executed by one or more processors of a computing system, cause the computing system to execute a runtime that performs a method for offering a type system foundation where instead of providing a base class library, the runtime provides for different frameworks to each be able to define their own base classes in a custom way, the method comprising acts of:
  one or more processors instantiating a runtime that defines one or more data contracts for each of a number of base classes, without actually providing any of the base classes themselves, each data contract specifying how objects of a base class should be structured but otherwise permitting the base class to support different methods and to specify different properties that the base class may have, and what constructors are used to create an instance of a base class; and
  using the runtime to interface with at least two outside frameworks, each framework determining the data contracts offered by the runtime, and then each framework using one or more data contracts in building its own base classes so that each framework is not forced to use the runtime's base classes and type system but is instead free to build its own base classes so long as each base class built by a framework conforms to at least one data contract defined by the runtime.

3. The computer program product in accordance with claim 2, wherein the at least some base classes built by is a first framework are specific to the first framework, and at least some base classes built by a second framework are different from the base classes built by the first framework and are specific to the second framework.

4. The computer program product in accordance with claim 2, wherein at least one of the data contracts permit one or more of the frameworks to name a corresponding base class built in accordance with the at least one data contract.

5. The computer program product in accordance with claim 2, wherein at least one of the data contracts permit one or more of the frameworks to assign a namespace to a corresponding base class built in accordance with the at least one data contract.

6. The computer program product in accordance with claim 2, wherein at least one of the data contracts permit one or more of the frameworks to assign framework-specific methods to a corresponding base class built in accordance with the at least one data contract.

7. The computer program product in accordance with claim 2, wherein at least one of the data contracts permit one or more of the frameworks to assign framework-specific properties to a corresponding base class built in accordance with the at least one data contract.

8. The computer program product in accordance with claim 2, wherein at least one of the data contracts permit one or more of the frameworks to assign a constructor to a corresponding base class built in accordance with the at least one data contract.

9. The computer program product in accordance with claim 2, wherein at least one of the base classes built by a framework is a string.

10. The computer program product in accordance with claim 2, wherein at least one of the base classes built by a framework is an integer.

11. The computer program product in accordance with claim 2, wherein at least one of the base classes built by a framework is a floating point.

12. The computer program product in accordance with claim 2, wherein at least one of the base classes built by a framework is a character.

13. The computer program product in accordance with claim 2, wherein at least one data contract specifies that any frameworks that define a base class in accordance with the at least one data contract also includes a type descriptor corresponding to the defined base class.

14. The computer program product in accordance with claim 13, wherein the type descriptor may be used to assist with type safety within a corresponding type system.

15. The computer program product in accordance with claim 13, wherein the type descriptor may be used to perform automatic memory management.

16. The computer program product in accordance with claim 13, wherein the type descriptor may be used to perform virtual calls.

17. The computer program product in accordance with claim 13, wherein the type descriptor may be used to perform interface calls.

18. One or more physical computer-readable storage media having thereon computer-executable instructions that, when executed by one or more processors of the computing system, cause the computing system to instantiate a software architecture in memory, the software architecture comprising:

a runtime that defines a plurality of data contracts for each of a number of base classes, without actually providing any of the base classes themselves, each data contract specifying how objects of a base class should be structured but otherwise permitting the base class to support different methods and to specify different properties that the base class may have, and what constructors are used to create an instance of a base class;

a first framework determining the data contracts offered by the runtime, and then using one or more data contracts to build its own base classes by using at least one data contract provided by the runtime for each base class built by the first framework, so that the first framework is not forced to use the runtime's base classes and type system but is instead free to build its own base classes so long as each base class built by the first framework conforms to at least one data contract defined by the runtime, at least one or more of the base classes built by the first framework being specific to the first framework only; and a second framework determining the data contracts offered by the runtime, and then using one or more data contracts to build its own base classes by using at least one data contract provided by the runtime for each base class built by the second framework, so that the second framework is not forced to use the runtime's base classes and type system but is instead free to build its own base classes so long as each base class built by the second framework conforms to at least one data contract defined by the runtime, at least one or more of the base classes built by the second framework being specific to the second framework only.

* * * * *